Patented Jan. 1, 1952

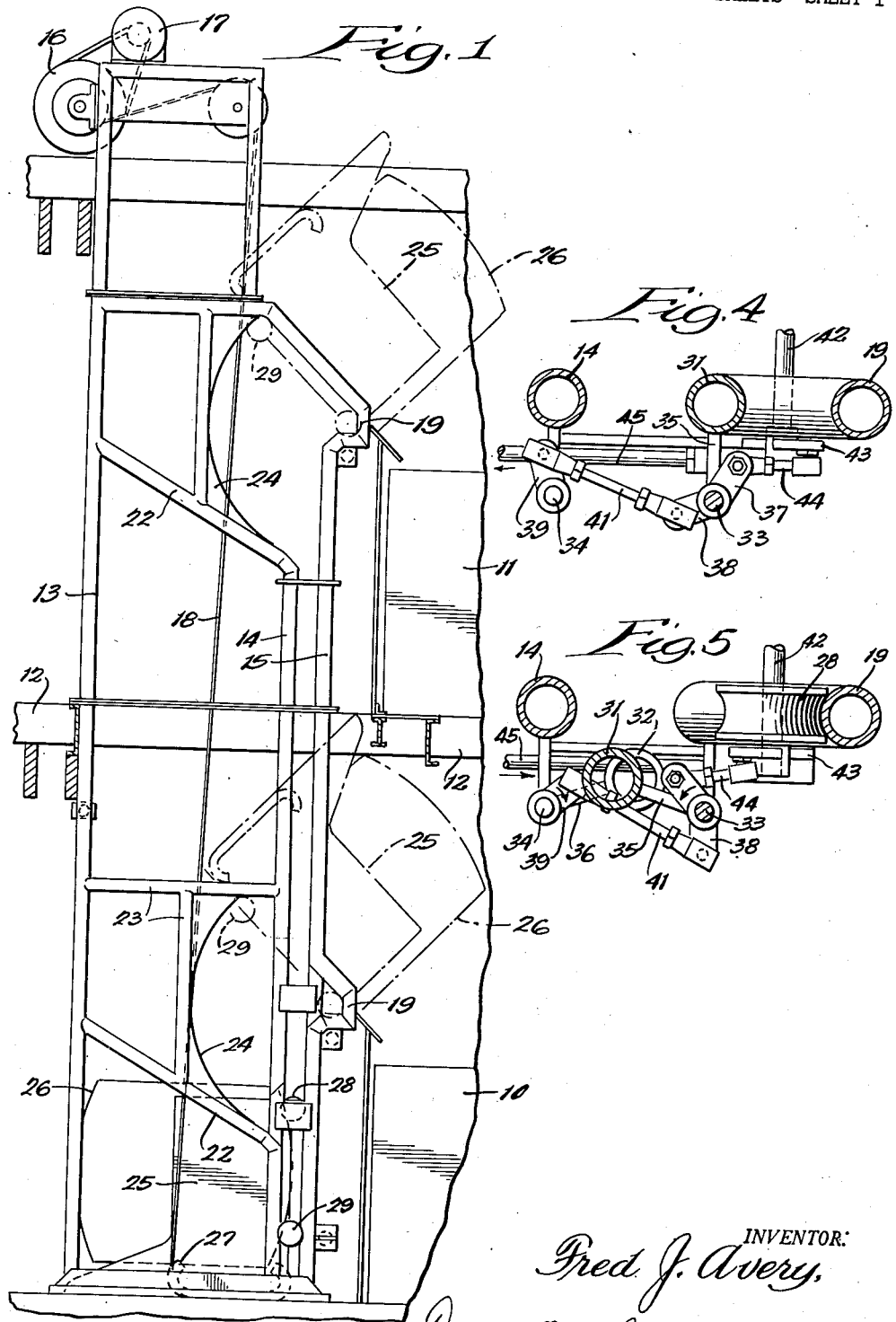

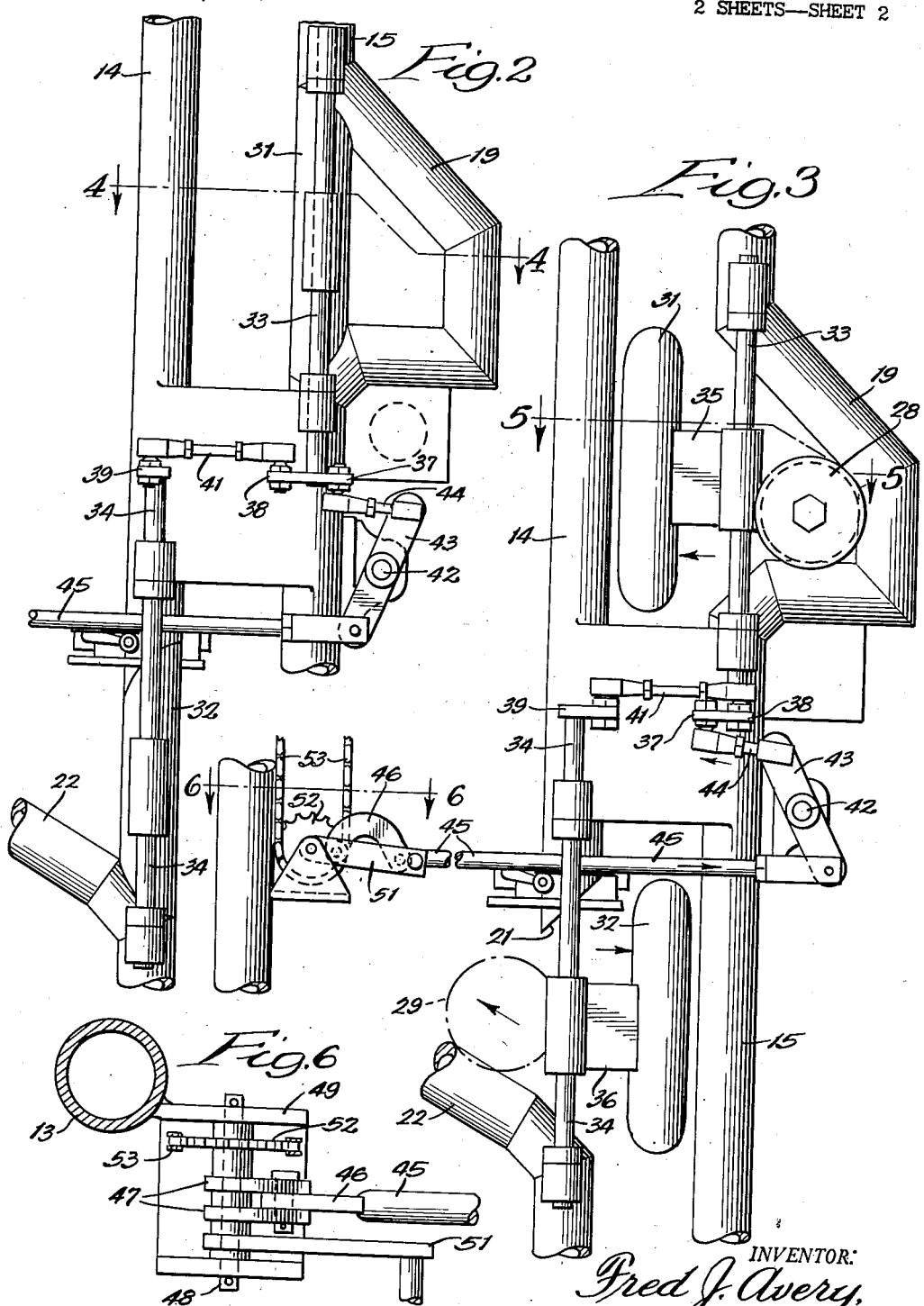

2,581,067

UNITED STATES PATENT OFFICE 2,581,067

MULTIPLE LEVEL DUMP STRUCTURE

Fred J. Avery, La Grange, Ill., assignor to Materials Transportation Company, Chicago, Ill., a corporation of Illinois Application February 25, 1950, Serial No. 146,277

10 Claims. (Cl. 214—120)

1

This invention relates to multiple level dump structure and more particularly to a vertical track structure by which loads can be selectively dumped at a plurality of different levels.

In industrial processing it is desirable on many occasions to elevate material from a lower or loading level and to dump it at a higher level for processing. For example, in meat packing it is desirable to carry products such as hams, slabs of bacon and the like to elevated curing tanks and to dump them in the tanks for curing. It is also highly desirable to be able to use the same elevating and dumping mechanism to dump or unload the materials at different elevations.

It is accordingly one of the objects of the present invention to provide a dump structure by which material may be dumped at any one of a plurality of different levels.

Another object is to provide a dump structure in which a vertical track structure is provided with gaps through which followers on a carriage movable along the tracks may pass to engage tilting guide members for dumping the carriage and in which segments are shiftable into and out of the gaps to control the dumping. With this construction when the segments are in the gaps, continuous tracks are provided so that the carriage will pass such gaps without dumping, and when the segments are out of the gaps the followers on the carriage will move into the gaps to engage the tilting guide members so that the carriage will be tilted for dumping.

Still another object is to provide a simple and positively acting mechanism for simultaneously shifting the segments controlling a plurality of tracks at a given dumping station into or out of the gaps. According to one feature the mechanism is self-locking so that accidental shifting of the segments is prevented.

The above and other objects and advantages of the invention will be more readily apparent when read in connection with the accompanying drawings, in which—

Figure 1 is a side elevation of a dump structure embodying the invention with the segment shifting mechanism omitted for clarity;

Figure 2 is a partial enlarged side elevation showing the segment control linkage;

Figure 3 is a view similar to Figure 2 showing the parts in the track opening position;

Figure 4 is a section on the line 4—4 of Figure 2;

Figure 5 is a section on the line 5—5 of Figure 3; and

Figure 6 is a partial section on the line 6—6 of Figure 3.

The mechanism, as illustrated in Figure 1, is

2 particularly designed for dumping vats or hogsheads or other containers containing pourable materials such, for example, as hams, slabs of bacon or the like which may be dry or suspended in a curing solution. As shown, the dump structure is designed to dump at any one of two levels to discharge the material into a lower vat 10 or an upper vat 11 supported on a floor 12 above the level of the vat 10. While the invention will be described in connection with this partciular process, it will be understood that it can equally well be applied to the handling of various other types of materials and can be extended to discharge the materials at any desired number of different levels.

The structure comprises a vertical framework including back uprights 13 extending the full length of the structure and having spaced forwardly therefrom pairs of tracks 14 and 15 spaced apart and parallel to each other throughout the major part of their length. The structure is preferably rectangular with a pair of laterally spaced back uprights 13 and two pairs of tracks, one at each side thereof lying in parallel spaced planes. At its upper end the structure carries a reel 16 driven by a motor 17 on which a cable 18 may be wound to raise or lower the carriage, as described hereinafter.

Each of the front tracks 15 is provided at a point adjacent the desired dumping levels with an offset portion 19 formed by extending the track forward of the structure to provide a short horizontal run. As shown, there is an offset 19 in each front track slightly above the top of each of the vats 10 and 11 to determine the dumping point. It will be noted that there is a gap in the vertical run of the track 15 opposite each of the offset portions 19. Each of the rear tracks 14 is similarly provided with a gap 21 below the offset portions 19. To form these gaps the rear tracks 14 are cut out at an angle, as shown, and braces 22 may be provided extending from the lower end of the gap to the rear upright 13. The braces 22 and cooperating framing members 23 form a support for an arcuately curved guide plate 24 which is curved about the center of the adjacent offset 19. The offsets 19 and guide plates 24 provide guide members to guide the carriage in its tilting movements. A carriage is provided to hold the vats, barrels or the like to be dumped and, as shown, comprises a rectangular frame 25 fitting between the front tracks and the rear uprights and adapted to receive a barrel or the like 26. The carriage has at its lower edge a curved cable guide plate 27 beneath which the cable 18 passes. The cable is anchored to the front part of the carriage so that when it is pulled it will lift on the guide plate 27 and elevate the carriage. To guide the movement of the carriage, it is equipped with an upper pair of rollers 28 and a lower pair of rollers 29 fitting between the tracks 14 and 15, as shown.

With the mechanism as so far described, when the carriage is elevated it will be held in a proper horizontal position by engagement of the rollers 28 and 29 with the tracks 14 and 15 as it is raised by the cables. When the upper rollers 28 reach the level of the offset portions 19, they will move through the gaps in the forward tracks 15 into the offset portions, as shown in Figure 3. At the same time the lower rollers 29 will travel through the lower gaps 21, as indicated in dotted lines in Figures 3, to ride up the curved guide plates 24. As the cable 18 is wound in, it will continue to elevate the bottom of the carriage until the carriage reaches the dumping position shown in dotted lines in Figure 1. It will be noted that the structure at both dumping levels is identical as so far described so that whenever the carriage reaches either level in its upward travel it will be tilted to dump the load carried thereby.

According to the present invention the carriage can be caused to dump selectively at either of the levels illustrated. For this purpose the gaps in the tracks at the lower level may be closed to provide continuous tracks at the lower level so that the carriage can continue on to the upper level. As shown, the gaps opposite the offsets 19 are closed by segments 31 which, as best seen in Figure 2, are tapered at their ends to interfit with the track 15 adjacent the ends of the offset. This construction positively prevents forward movement of the segments 31 beyond alignment with the tracks 15 so that a solid continuous track is formed. The lower gaps are similarly closed by segments 32 which are also tapered at their ends to interfit with the track 14 at the ends of the gap 21 so that rearward movement of the segments is positively prevented, and a smooth continuous track is formed.

To support the segments for movement into and out of the gaps, pivot rods 33 and 34 are provided lying parallel to but spaced outside of the tracks 15 and 14, respectively. The pivot rods 33 are connected to the segments 31 by arms 35, and the pivot rods 34 are similarly connected to the segments 32 by arms 36. With this support, as best seen in Figures 4 and 5, when the pivot rods are turned the segments will be swung generally toward each other and laterally out of the plane of the tracks 14 and 15 so that they will not interfere with free travel of the guide rollers 28 and 29 along the tracks. It will be understood that the mechanism as described is duplicated on each side of the structure with the pivot rods in both cases lying outside of the structure so that the segments will be swung out of the way of the rollers.

To move the segments each pivot rod 33 has secured to its lower end a bell crank the arms 37 and 38 of which extend in opposite directions from the pivot rod. The pivot rod 34 carries a crank arm 39 at its upper end which extends generally opposite from its pivot rod to the bell crank arm 38 on the rod 33. The free ends of the arms 38 and 39 are connected by a link 41. With this construction when one of the pivot rods turns in one direction the other will turn in the opposite direction, as illustrated by Figures 4 and 5, so that the segments 31 and 32 will be swung generally toward each other and outside of the plane of the tracks. To turn the pivot rods a control mechanism is provided including a shaft 42 extending across the front of the front tracks 15 and carrying at each end a lever 43. The upper end of each lever 43 is connected through a link 44 with the outer end of the bell crank arm 37. This construction ties together the segment controlling mechanism on opposite sides of the structure so that all of the segments at the same dumping level will be operated simultaneously.

To turn the rod 42, the lower end of crank 43, as shown in Figure 3, is connected to a tie link 45, the rearward end of which is connected to a curved extension 46. The curved extension 46 is pivoted to arms 47 carried by a control shaft 48 (Figure 6) which is mounted on a support 49 rigidly connected to the rear upright 13. The shaft 48 may be turned by a crank 51 which can be operated by hand to move the link 45 lengthwise to an extreme position to the right, as shown in Figure 3, or an extreme position to the left, as shown in Figure 2. The arms 47 and link 45 form an over center toggle device which is self-locking, which will prevent any accidental movement of the segments. The curved extension 46 straddles the shaft 48 when the parts are in the position shown in Figure 2 to enable the over center movement. As the shaft 48 is turned, it will move the levers 43 and shaft 42 to swing the segments into or out of the gaps in the track thereby controlling the level at which the load will be dumped. If preferred, the switch mechanism may be remotely controllable through either power or manually operable control devices. For this purpose in the construction shown, the shaft 48 may also carry a sprocket 52 over which a chain 53 may pass so that through the chain 53 the mechanism can be controlled from a remote point. For example, from the upper loading level the operator can readily control the level at which the vat will be dumped through one or more chains 53.

When the segments are in place in the tracks, as illustrated in Figure 2, the rollers 28 and 29 will ride freely over them so that the carriage will pass that particular dumping level and will not dump until it reaches the next higher level at which the gaps in the tracks are open. When it is desired to dump the load, the crank 51 may be swung to retract the link 45 or the same operation may be accomplished through the chain 53 so that the segments will be swung out of the gaps and dumping will occur.

While one embodiment of the invention has been shown and described in detail herein, it will be understood that this is illustrative only and is not to be taken as a definition of the scope of the invention, reference being had for this purpose to the appended claims.

What is claimed is:

1. A multiple level dump structure comprising a plurality of vertical parallel tracks having gaps therein at a desired dumping level, a carriage having followers thereon fitting between and engaging the tracks to guide the carriage for vertical movement along the tracks, the followers being movable through the gaps respectively, offset guide members associated with the gaps in the tracks to engage the followers and guide the carriage through a tilting movement, track segments fitting the gaps in the tracks, pivot rods parallel to but spaced from the tracks respectively, arms carried by the pivot rods and carrying the respective segments, and linkage connecting the pivot rods simultaneously to turn them in opposite directions such that the segments swing toward each other out of the gaps in the tracks.

2. A multiple level dump structure comprising a pair of vertical parallel tracks having gaps therein at a desired dumping level, a carriage having vertically spaced followers thereon fitting between and engaging the tracks and adapted to enter the gaps respectively, guide members associated with the gaps in the tracks to engage the followers and guide the carriage through a tilting movement, track segments fitting the gaps in the tracks, the track segments and tracks interfitting to limit movement of the segments outward of the tracks, and supporting means for the segments to move them inward and laterally of the tracks to open the gaps.

3. A multiple level dump structure comprising a pair of vertical parallel tracks having gaps therein at a desired dumping level, a carriage having vertically spaced followers thereon fitting between and engaging the tracks and adapted to enter the gaps respectively, guide members associated with the gaps in the tracks to engage the followers and guide the carriage through a tilting movement, track segments fitting the gaps in the tracks, the track segments and tracks interfitting to limit movement of the segments outward of the tracks, pivot rods parallel to and spaced from the tracks, arms on the pivot rods supporting the segments respectively, and operating means to turn the pivot rods simultaneously in opposite directions to move the segments inward and laterally of the gaps.

4. A multiple level dump structure comprising a pair of vertical parallel tracks having gaps therein at a desired dumping level, a carriage having a follower thereon fitting between and engaging the tracks, guide members associated with the gaps in the tracks to engage the follower and guide the carriage through a tilting movement, track segments fitting the gaps in the tracks, the track segments and tracks interfitting to limit movement of the segments outward of the tracks, pivot rods parallel to and spaced from the tracks, arms on the pivot rods supporting the segments respectively, crank arms on the pivot rods extending in opposite directions therefrom, a link connecting the crank arms, and means to turn one of the pivot rods thereby to turn the other pivot rod in the opposite direction.

5. The construction of claim 4 in which the last named means comprises a toggle linkage to latch the pivot rods in either extreme position with the segments fully in or fully out of the gaps.

6. A multiple level dump structure comprising two pairs of parallel vertical tracks lying in spaced parallel planes, the tracks having gaps therein at a desired dumping level, a carriage having followers thereon fitting between and engaging the tracks of the pairs, guide members associated with the gaps in the tracks to engage the followers and guide the carriage through a tilting movement, track segments fitting the gaps in the tracks, means supporting the segments for each pair of tracks for movement toward the horizontal center of the pair of tracks and laterally out of the plane of the tracks, and linkage connecting the means simultaneously to move all of the segments.

7. A multiple level dump structure comprising two pairs of parallel vertical tracks lying in spaced parallel planes, the tracks having gaps therein at a desired dumping level, a carriage having followers thereon fitting between and engaging the tracks of the pairs, guide members associated with the gaps in the tracks to engage the followers and guide the carriage through a tilting movement, track segments fitting the gaps in the tracks, a pivot rod lying parallel to each track outside of said planes, an arm on each pivot rod supporting the adjacent segment, and means simultaneously to turn the pivot rods to swing the segments into and out of the gaps.

8. A multiple level dump structure comprising two pairs of parallel vertical tracks lying in spaced parallel planes, the tracks having gaps therein at a desired dumping level, a carriage having followers thereon fitting between and engaging the tracks of the pairs, guide members associated with the gaps in the tracks to engage the followers and guide the carriage through a tilting movement, track segments fitting the gaps in the tracks, a pivot rod lying parallel to each track outside of said planes, an arm on each pivot rod supporting the adjacent segment, a crank arm on each pivot rod with the crank arms on each pair extending in opposite directions, links connecting the crank arms of the pairs of rods, a cross shaft extending between the pairs of tracks, and connections from the opposite ends of the shaft to one pivot rod of the respective pairs simultaneously to turn all of the pivot rods.

9. A multiple level elevating and discharging structure comprising a plurality of vertical parallel tracks having gaps therein at a desired discharging level, a carriage having vertically spaced followers thereon engaging the tracks to guide the carriage for vertical movement along the tracks, the followers being movable through the gaps respectively, guide means adjacent the gaps to engage the followers after they have moved through the gaps and guide the carriage through a tilting movement, track segments fitting into the gaps in the tracks to guide the followers across the gaps, and means for simultaneously moving the segments into and out of the gaps.

10. A multiple level elevating and discharging structure comprising a plurality of vertical parallel tracks having gaps therein at a desired discharging level, a carriage having vertically spaced followers thereon engaging the tracks to guide the carriage for vertical movement along the tracks, the followers being movable through the gaps respectively, guide means adjacent the gaps to engage the followers after they have moved through the gaps and guide the carriage through a tilting movement, track segments fitting into the gaps in the tracks to guide the followers across the gaps, pivoted arms supporting the segments for movement laterally of the track into and out of the gaps, and linkage interconnecting the arms to move them simultaneously.

FRED J. AVERY.

REFERENCES CITED

The following references are of record in the file of this patent:

UNITED STATES PATENTS

| Number | Name | Date |
|---|---|---|
| 445,611 | Ruddell | Feb. 3, 1891 |
| 818,225 | Brown | Apr. 17, 1906 |
| 1,487,196 | Bledsoe | Mar. 18, 1924 |
| 1,563,486 | Hely | Dec. 1, 1925 |
| 2,011,656 | Sill | Aug. 20, 1935 |

FOREIGN PATENTS

| Number | Country | Date |
|---|---|---|
| 450,828 | Germany | Oct. 18, 1927 |